United States Patent
Park et al.

(10) Patent No.: US 7,718,736 B2
(45) Date of Patent: May 18, 2010

(54) BASE RESISTANT FKM-TPV ELASTOMERS

(75) Inventors: Edward Hosung Park, Saline, MI (US); Francis Joseph Walker, Tecumseh, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 872 days.

(21) Appl. No.: 11/171,720

(22) Filed: Jun. 30, 2005

(65) Prior Publication Data

US 2007/0004862 A1    Jan. 4, 2007

(51) Int. Cl.
- C08L 27/12 (2006.01)
- C08L 27/18 (2006.01)
- C08L 25/02 (2006.01)
- C08F 214/26 (2006.01)

(52) U.S. Cl. ........................ 525/199; 525/200
(58) Field of Classification Search ............. 525/199, 525/200
See application file for complete search history.

(56) References Cited

U.S. PATENT DOCUMENTS

| | | | |
|---|---|---|---|
| 2,476,884 A | 7/1949 | Maynard |
| 3,037,954 A | 6/1962 | Gessler et al. |
| 3,538,028 A | 11/1970 | Morgan |
| 3,580,889 A | 5/1971 | Barney et al. |
| 3,787,341 A | 1/1974 | Aron |
| 3,853,811 A | 12/1974 | Chandrasekaran |
| 3,884,877 A | 5/1975 | Kolb |
| 4,035,565 A | 7/1977 | Apotheker et al. |
| 4,094,949 A | 6/1978 | Yokokawa et al. |
| 4,287,320 A | 9/1981 | Kolb |
| 4,311,628 A | 1/1982 | Abdou-Sabet et al. |
| 4,328,140 A | 5/1982 | Singletary et al. |
| 4,419,499 A | 12/1983 | Coran et al. |
| 4,450,263 A | 5/1984 | West |
| 4,451,542 A | 5/1984 | Ishida et al. |
| 4,491,536 A | 1/1985 | Tomoda |
| 4,530,881 A | 7/1985 | Santoso et al. |
| 4,572,516 A | 2/1986 | Symons et al. |
| 4,624,978 A | 11/1986 | Frayer |
| 4,656,228 A | 4/1987 | Richter et al. |
| 4,696,976 A | 9/1987 | Ellerbe, III et al. |
| 4,696,989 A | 9/1987 | Oka et al. |
| 4,696,998 A | 9/1987 | Brunelle et al. |
| 4,713,418 A | 12/1987 | Logothetis et al. |
| 4,787,991 A | 11/1988 | Morozumi et al. |
| 4,812,357 A | 3/1989 | O'Rell et al. |
| 5,006,594 A | 4/1991 | Rees |
| 5,095,072 A | 3/1992 | Kobayashi et al. |
| 5,108,780 A | 4/1992 | Pitt et al. |
| 5,206,293 A | 4/1993 | Sakai et al. |
| 5,219,931 A | 6/1993 | Siol et al. |
| 5,331,040 A | 7/1994 | Lee |
| 5,354,811 A | 10/1994 | Kamiya et al. |
| 5,371,143 A | 12/1994 | Novak et al. |
| 5,384,374 A | 1/1995 | Guerra et al. |
| 5,391,610 A | 2/1995 | Comert et al. |
| 5,397,832 A | 3/1995 | Ellul |
| 5,459,202 A | 10/1995 | Martinez et al. |
| 5,548,028 A | 8/1996 | Tabb |
| 5,585,152 A | 12/1996 | Tamura et al. |
| 5,589,526 A | 12/1996 | Sienel et al. |
| 5,639,810 A | 6/1997 | Smith, III et al. |
| 5,700,866 A | 12/1997 | Tabb |
| 5,723,544 A | 3/1998 | Lee |
| 5,747,588 A | 5/1998 | Mann |
| 5,792,348 A | 8/1998 | Eisinga |
| 5,910,544 A | 6/1999 | Ozawa et al. |
| 5,962,589 A | 10/1999 | Matsumoto et al. |
| 6,048,939 A | 4/2000 | Priester |
| 6,054,537 A | 4/2000 | Shimizu et al. |
| 6,066,697 A | 5/2000 | Coran et al. |
| 6,079,465 A | 6/2000 | Takeyama et al. |

(Continued)

FOREIGN PATENT DOCUMENTS

CA    2475263    9/2003

(Continued)

OTHER PUBLICATIONS

Webpage: "Dyneon™ Fluorothermoplastics" Accessed from 3M Manufacturing and Industrial and Downloaded May 8, 2003. (2 pages).

(Continued)

*Primary Examiner*—Nathan M Nutter
(74) *Attorney, Agent, or Firm*—Ronald W. Wangerow; Harness, Dickey & Pierce, P.L.C.

(57) ABSTRACT

A processable rubber composition contains a double cured fluorocarbon elastomer dispersed in a matrix of a thermoplastic polymeric material. The cured elastomer contains repeating units derived from one or more fluorine-containing monomers, and further contains low levels of a peroxide cure site that contains at least one of a C—Cl bond, a C—Br bond, a C—I bond, and an olefin. In one embodiment the matrix forms a continuous phase and the vulcanized elastomeric material is in the form of particles forming a non-continuous phase. In various embodiments, the processable compositions are thermally processed into molded articles that exhibit a high degree of base resistance, especially a high degree of resistance to degradation of physical properties upon exposure to fluids containing strong nucleophiles such as amines.

26 Claims, No Drawings

U.S. PATENT DOCUMENTS

| | | |
|---|---|---|
| 6,114,441 A | 9/2000 | Spohn et al. |
| 6,147,158 A | 11/2000 | Chmielewski |
| 6,162,385 A | 12/2000 | Grosse-Puppendahl et al. |
| 6,310,141 B1 | 10/2001 | Chen et al. |
| 6,312,639 B1 | 11/2001 | Ertle et al. |
| 6,407,174 B1 | 6/2002 | Ouhadi |
| 6,410,630 B1 | 6/2002 | Hoover et al. |
| 6,429,249 B1 | 8/2002 | Chen et al. |
| 6,437,030 B1 | 8/2002 | Coran et al. |
| 6,500,374 B1 | 12/2002 | Akioka et al. |
| 6,624,251 B1 | 9/2003 | Chmielewski |
| 6,649,704 B2 | 11/2003 | Brewer et al. |
| 6,656,831 B1 | 12/2003 | Lee et al. |
| 6,663,966 B2 | 12/2003 | Mhetar |
| 6,737,479 B2 | 5/2004 | Faulkner |
| 7,022,769 B2 | 4/2006 | Park |
| 7,029,750 B2 | 4/2006 | Takei et al. |
| 7,098,270 B2 | 8/2006 | Hochgesang et al. |
| 2002/0113066 A1 | 8/2002 | Stark et al. |
| 2002/0122928 A1 | 9/2002 | Botrie et al. |
| 2002/0198320 A1 | 12/2002 | Chmielewski et al. |
| 2003/0026995 A1 | 2/2003 | Duchesne et al. |
| 2003/0138655 A1 | 7/2003 | Watanabe et al. |
| 2003/0144409 A1 | 7/2003 | Kassa et al. |
| 2003/0166780 A1 | 9/2003 | Shimizu et al. |
| 2004/0045635 A1 | 3/2004 | Bandyopadhyay et al. |
| 2004/0183702 A1 | 9/2004 | Nachtigal et al. |
| 2004/0260023 A1 | 12/2004 | Park et al. |
| 2005/0148183 A1 | 7/2005 | Shiro et al. |
| 2005/0155690 A1 | 7/2005 | Park |
| 2005/0165168 A1 | 7/2005 | Park |
| 2005/0167928 A1 | 8/2005 | Park et al. |
| 2005/0171282 A1 | 8/2005 | Park |
| 2005/0222337 A1 | 10/2005 | Park |
| 2005/0272872 A1 | 12/2005 | Park |
| 2005/0275565 A1 | 12/2005 | Nachtigal et al. |
| 2005/0281973 A1 | 12/2005 | Park |
| 2005/0288434 A1 | 12/2005 | Sugiura et al. |
| 2006/0003127 A1 | 1/2006 | Park et al. |
| 2006/0004126 A1 | 1/2006 | Park et al. |
| 2006/0004142 A1 | 1/2006 | Park et al. |
| 2006/0124889 A1 | 6/2006 | Park et al. |
| 2006/0142467 A1 | 6/2006 | Park |
| 2006/0142491 A1 | 6/2006 | Park |
| 2006/0142492 A1 | 6/2006 | Park |
| 2006/0148954 A1 | 7/2006 | Park et al. |
| 2006/0290070 A1 | 12/2006 | Park |
| 2007/0004865 A1 | 1/2007 | Park |
| 2007/0044906 A1* | 3/2007 | Park ........................ 156/272.2 |
| 2007/0055020 A1 | 3/2007 | Park |
| 2008/0149881 A1 | 6/2008 | Park |
| 2008/0157439 A1 | 7/2008 | Park et al. |

FOREIGN PATENT DOCUMENTS

| | | |
|---|---|---|
| CA | 2513789 | 8/2004 |
| EP | 0132583 | 2/1985 |
| EP | 0148719 | 7/1985 |
| EP | 0239707 | 10/1987 |
| EP | 0 168 020 B1 | 10/1989 |
| EP | 0422960 | 4/1991 |
| EP | 0432911 | 6/1991 |
| EP | 0439734 | 8/1991 |
| EP | 0254307 | 12/1991 |
| EP | 0304843 | 3/1993 |
| EP | 0566313 | 10/1993 |
| EP | 0681113 | 11/1995 |
| EP | 0714944 | 6/1996 |
| EP | 1209203 | 5/2002 |
| GB | 1357904 | 6/1974 |
| JP | 58-032655 | 2/1983 |
| JP | 62-011767 | 1/1987 |
| JP | 62-236841 | 10/1987 |
| JP | 05-156090 | 6/1993 |
| JP | 05-186606 | 7/1993 |
| JP | 06-016949 | 1/1994 |
| JP | 11-140269 | 5/1999 |
| JP | 2000-079928 | 3/2000 |
| JP | 2001-336679 | 12/2001 |
| WO | WO 96/00761 | 1/1996 |
| WO | WO 00/11073 | 3/2000 |
| WO | WO 01/48077 | 7/2001 |
| WO | WO 01/98405 | 12/2001 |

OTHER PUBLICATIONS

Material Safety Data Sheet "DuPont™ TPV 60A01 and 80A01", C.S. Wong, (Sep. 18, 2001). (9 pages).

Kim, K. et al. "Mold Release Additive Effects on Chlorine and Fluorine Rubber Compound" Struktol Company of America Paper No. 7, Presented at IRMC 2004 Meeting. Apr. 27-28, 2004. (18 pages).

Solvay Solexis: "Product Data Sheet: Tecnoflon FPA 1" available at www.solvaysolexis.com. Copyright 2003. (2 pages).

Schmiegel, Walter W., "A Review of Recent Progress in the Design and Reactions of Base-Resistant Fluoroelastomers.", IRC, Jul. 2003.

"AFLAS™ The Fluoroelastomer", Asahi Glass Company, Product Information, pp. 1-8, Apr. 11, 2003.

"Fluorine-Containing Polymers", Encyclopedia of Polymer Science & Engineering, vol. 7, 1987, Second Edition, pp. 256-267.

"Viton® Fluoroelasotmer, A Product of DuPont Dow Elastomers", Technical Information, DuPont Dow Elastomers, Copyright 1988.

Michael J. Moore, "Silanes as Rubber-to-Metal Bonding Agents", 160th Meeting of the Rubber Division, American Chemical Society, Cleveland Ohio, Paper No. 105, pp. 1-17, 2001.

* cited by examiner

BASE RESISTANT FKM-TPV ELASTOMERS

FIELD OF THE INVENTION

The present invention relates to thermoprocessable compositions containing cured fluorocarbon elastomers. It also relates to seal and gasket type material made from the compositions and methods for their production by dynamic vulcanization techniques.

INTRODUCTION

Cured elastomeric materials have a desirable set of physical properties typical of the elastomeric state. They show a high tendency to return to their original size and shape following removal of a deforming force, and they retain physical properties after repeated cycles of stretching, including strain levels up to 1000%. Based on these properties, the materials are generally useful for making shaped articles such as seals and gaskets.

Because they are thermoset materials, cured elastomeric materials can not generally be processed by conventional thermoplastic techniques such as injection molding, extrusion, or blow molding. Rather, articles must be fashioned from elastomeric materials by high temperature curing and compression molding. Although these and other rubber compounding operations are conventional and known, they nevertheless tend to be more expensive and require higher capital investment than the relatively simpler thermoplastic processing techniques. Another drawback is that scrap generated in the manufacturing process is difficult to recycle and reuse, which further adds to the cost of manufacturing such articles.

Dynamic vulcanizates have elastomeric properties but have thermoplastic like flow properties. As such, they can be inexpensively processed, and scrap can be re-used. Vulcanizates based on fluorocarbon polymers also have advantageous properties such as resistance to solvents.

In today's automobile engines, the high temperatures of use have led to the development of a new generation of lubricants containing a high level of basic materials such as amines. Articles made from elastomeric materials, such as seals and materials such as amines. Articles made from elastomeric materials, such as seals and gaskets, are in contact with such fluids during use, and are subject to a wide variety of challenging environmental conditions, including exposure to high temperature, contact with corrosive chemicals, and high wear conditions during normal use. Accordingly, it is desirable to make such articles from materials that combine elastomeric properties and stability or resistance to the environmental conditions.

To meet the demands of the new lubricant technology, a line of fluorocarbon elastomers has been developed highly resistant to the basic compounds found in the lubricating oils and greases. Specifically, cured elastomers based on copolymers of tetrafluoroethylene and propylene have met commercial success. As a thermoset material, the cured fluorocarbon rubber is subject to the processing disadvantages noted above.

It would be an advance in the art to provide an elastomeric or rubber composition that would combine a high level of chemical resistance with the advantages of thermoplastic processability. It would further be desirable to provide methods for formulating chemically resistant rubbers having such advantageous properties.

SUMMARY

The present invention provides processable rubber compositions containing a vulcanized elastomeric material dispersed in a matrix of a thermoplastic polymeric material. The vulcanized elastomeric material comprises a double cured polymeric material comprising repeating units derived from one or more fluorine-containing monomers, and low levels of a peroxide cure site that contains at least one of a C—Cl bond, a C—Br bond, a C—I bond, and an olefin. In one embodiment the matrix forms a continuous phase and the vulcanized elastomeric material is in the form of particles forming a non-continuous phase. In various embodiments, the processable compositions are thermally processed into molded articles that exhibit a high degree of base resistance, especially a high degree of resistance to degradation of physical properties upon exposure to fluids containing strong nucleophiles such as amines.

A method for making a rubber composition comprises combining a radical curing system, a curable elastomeric material having cure sites highly reactive to radical initiators, a polyol curing system and a thermoplastic material, and heating the mixture at a temperature and for a time sufficient to effect vulcanization of the elastomeric material, while mechanical energy is applied to mix the mixture during the heating step. The elastomeric material is a fluorocarbon polymer and the thermoplastic material comprises a fluorine containing polymeric material that softens and flows upon heating.

In various embodiments, double cure of the elastomeric material leads to processable rubber compositions that exhibit better base resistance than dynamic vulcanizates of the same elastomeric material cured only with a radical curing system. Shaped articles may be readily formed from the rubber compositions according to conventional thermoplastic processes such as blow molding, injection molding, and extrusion. Examples of useful articles include seals, gaskets, O-rings, and hoses.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION

The following description of the preferred embodiment(s) is merely exemplary in nature and is in no way intended to limit the invention, its application, or uses.

The headings (such as "Introduction" and "Summary,") used herein are intended only for general organization of topics within the disclosure of the invention, and are not intended to limit the disclosure of the invention or any aspect thereof. In particular, subject matter disclosed in the "Introduction" may include aspects of technology within the scope of the invention, and may not constitute a recitation of prior art. Subject matter disclosed in the "Summary" is not an exhaustive or complete disclosure of the entire scope of the invention or any embodiments thereof.

The citation of references herein does not constitute an admission that those references are prior art or have any relevance to the patentability of the invention disclosed herein. All references cited in the Description section of this specification are hereby incorporated by reference in their entirety.

The description and specific examples, while indicating embodiments of the invention, are intended for purposes of illustration only and are not intended to limit the scope of the invention. Moreover, recitation of multiple embodiments having stated features is not intended to exclude other embodiments having additional features, or other embodiments incorporating different combinations of the stated features. Specific Examples are provided for illustrative purposes of how to make, use and practice the compositions and methods of this invention and, unless explicitly stated otherwise, are not intended to be a representation that given embodiments of this invention have, or have not, been made or tested.

As used herein, the words "preferred" and "preferably" refer to embodiments of the invention that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, the word "include," and its variants, is intended to be non-limiting, such that recitation of items in a list is not to the exclusion of other like items that may also be useful in the materials, compositions, devices, and methods of this invention.

When exposed to environments containing strong nucleophiles such as the amines in modern day engine oils in automotive applications, rubbers tend to change their elastomeric properties with time of exposure. Normally the rubbers degrade over time when exposed to such fluids. The degradation is expressed as a change in physical parameters such as tensile strength, modulus, hardness, elongation at break, and others. According to various embodiments of the invention, it has been found that base resistance is enhanced when fluorocarbon rubbers are cured by both radical curing systems and phenol curing systems in the presence of thermoplastic materials as discussed herein.

Cured elastomers are normally produced by curing or crosslinking a curable elastomeric composition. They have elastomeric properties that are more highly developed than the uncured materials from which they are produced. For example, cured elastomeric particles have hardness higher than that both of an uncured fluorocarbon elastomer gum and a thermoplastic material. The relatively higher hardness of the cured elastomer can be determined in the dynamic vulcanizates of the invention, for example in cross-sectional analysis with analytical techniques such as an atomic force microscope. In various aspects, the curable compositions are referred to as fluorocarbon elastomer rubbers or fluorocarbon elastomer gums in recognition of the fact that they are curable to give thermoset polymers having elastomeric properties. Elastomeric properties include resilience, resistance to compression set, and softness, which are generally due to a content of cured rubber particles in the materials.

Thermoplastic vulcanizates derived from dynamic vulcanization as described in this application contain cured rubber particles in a continuous or co-continuous thermoplastic matrix. The materials exhibit bulk physical properties that are rubber like, even though the compositions can be thermoplastically processed.

In one aspect of the invention, fluorocarbon elastomers are crosslinked by two mechanisms. The first is a radical cure mechanism that is by the reaction of a di- or higher olefinic crosslinking co-agent with a free radical induced by reaction of the (uncured) fluoroelastomer with a radical initiator such as organic peroxide. The second mechanism is nucleophilic attack on the (uncured) fluoroelastomer by a di- or higher functional polyol crosslinking agent such as a polyphenol or diphenol. The curing is referred to as a "double cure" or a "dual cure". The elastomers crosslinked by the dual mechanism contain covalent crosslinks comprising the reaction product of the olefinic co-agent and polyol crosslinking agent with the fluorocarbon elastomer polymer backbone.

The processable compositions are made into various shaped articles such as seals, gaskets, o-rings, hoses, and the like. The molded articles preferably exhibit an advantageous combination of elastomeric properties. Furthermore, in various embodiments, the base resistance of articles made from the processable compositions of the invention is higher than that of articles made of the cured fluorocarbon rubbers themselves.

In one embodiment, the invention provides a processable rubber composition comprising an amorphous phase dispersed in a thermoplastic phase. The amorphous phase comprises a fluorocarbon elastomer composition crosslinked with both a radical curing system and a polyol curing system, while the thermoplastic phase comprises a thermoplastic polymeric material.

In another embodiment, the invention provides shaped articles having elastomeric properties, which are produced from the composition by thermoplastic processing techniques. The shaped articles contain an amorphous composition dispersed in a thermoplastic composition, wherein the amorphous composition comprises a fluorocarbon elastomer composition crosslinked with both a radical curing system and a polyol curing system, while the thermoplastic composition comprises a thermoplastic polymeric material. In preferred embodiments, the thermoplastic polymeric material comprises an amorphous material having a glass transition temperature grater than 120° C. or a semi-crystalline polymeric material having a crystalline melting point of higher than or equal to 120° C. Non-limiting examples of shaped articles include seals, o-rings, and gaskets.

In another embodiment, the invention provides a base resistant rubber sealing member comprising a product of thermoplastic processing of a dynamic vulcanizate. The dynamic vulcanizate is the product of dynamic cure of a fluorocarbon elastomer composition in a thermoplastic material in the presence of both a radical curing system and a polyol curing system. The fluorocarbon elastomer composition comprises a fluoropolymer with repeating units derived from at least one fluoroolefin monomer and further containing cure sites. The cure sites contain at least one functional group selected from the group consisting of a carbon chlorine bond, a carbon bromine bond, a carbon iodine bond, and an olefin. Preferably, the thermoplastic material comprises an amorphous polymeric material having a glass transition temperature greater than 150° C. or a semi-crystalline polymeric material having a crystalline melting point of 150° C. or higher.

In another embodiment, methods are provided for making the processable rubber compositions. The methods involve dynamically vulcanizing a fluorocarbon elastomer in the presence of a thermoplastic material, under conditions where the fluorocarbon elastomer is cured by both a radical curing system and a polyol curing system. In a preferred embodiment, the radical curing system comprises organic peroxide and a crosslinking co-agent comprising at least two olefinic groups. In a preferred embodiment, the polyol curing system comprises a phenol crosslinking agent, an onium compound, and a hydrogen acceptor.

In various embodiments, the method of the invention provides for mixing the elastomer and thermoplastic components in the presence of a dual curing system and heating during the mixing to effect a so-called double cure of the elastomeric component. In one embodiment, the elastomeric material and thermoplastic material are mixed for a time and at a shear rate sufficient to form a dispersion of the elastomeric material in a continuous thermoplastic phase. Thereafter, a radical curing system such as a peroxide and crosslinking co-agent is added to the dispersion of elastomeric material and thermoplastic material while continuing the mixing. Simultaneously or separately, a phenol curing system containing a phenol crosslinker, an onium compound, and a proton acceptor is added. Finally, the dispersion is heated while continuing to mix to produce the processable rubber composition of the invention.

The processable rubber compositions of the invention are readily processable by conventional thermoplastic processing techniques such as injection molding, extrusion, compression molding, and blow molding. In another embodiment, shaped articles are provided comprising the vulcanized elastomeric materials dispersed in a thermoplastic matrix. Shaped articles of the invention include, without limitation, seals, O-rings, gaskets, and hoses.

In one aspect, the invention is based on a discovery that the base resistance of processable rubber compositions, and of shaped articles such as sealing members prepared from them, is enhanced when fluorocarbon elastomers are subjected to a dynamic vulcanization involving crosslinking the elastomers with both a radical curing system and a polyol curing system. Radical curing systems include those containing a peroxide initiator, while polyol curing systems are exemplified by well known phenol curing systems. As discussed below, the radical curing system also contains a usually olefinic crosslinking co-agent along with an acid acceptor such as ZnO, while the polyol curing system usually contains an onium compound and an acid acceptor such as MgO or $Ca(OH)_2$ in addition to the polyol or phenol crosslinking agent. Vulcanization conditions, especially temperature and presence of accelerators, are adjusted during the double cure process to provide for sequential or simultaneous cure under the two mechanisms.

In various embodiments, a single fluorocarbon elastomer is dynamically vulcanized with double cure in the presence of a thermoplastic. The single fluorocarbon elastomer is a "peroxide curable" elastomer containing "peroxide cure sites" as described below. Alternatively, two or more fluorocarbon elastomers are dynamically vulcanized together. In various embodiments, the two or more fluorocarbon elastomers comprise two or more peroxide curable elastomers. In some embodiments, the two or more fluorocarbon elastomers comprise, in addition to one or more peroxide curable elastomers, an elastomer that is polyol or phenol curable but does not contain peroxide cure sites. As described below, in some embodiments, a second fluorocarbon elastomer is phenol cure incorporated and provides a source of polyol crosslinker for double cure of the peroxide curable elastomer.

Various types of fluoroelastomers are suitable for use as the peroxide curable elastomer or phenol curable elastomer. Suitable fluoroelastomers include those classified in ASTM-D 1418, "Standard practice for rubber and rubber lattices-nomenclature" as FKM, FFKM, and FTPM.

The designation FKM is given to fluororubbers that utilize vinylidene fluoride as a co-monomer. Several varieties of FKM fluoroelastomers are commercially available. A first variety may be chemically described as a copolymer of hexafluoropropylene and vinylidene fluoride. These FKM elastomers tend to have an advantageous combination of overall properties. Some commercial embodiments are available with about 66% by weight fluorine. Another type of FKM elastomer may be chemically described as a terpolymer of tetrafluoroethylene, hexafluoropropylene, and vinylidene fluoride. Such elastomers tend to have high heat resistance and good resistance to aromatic solvents. They are commercially available with, for example 68-69.5% by weight fluorine. Another FKM elastomer is chemically described as a terpolymer of tetrafluoroethylene, a fluorinated vinyl ether, and vinylidene fluoride. Such elastomers tend to have improved low temperature performance. In various embodiments, they are available with 62-68% by weight fluorine. A fourth type of FKM elastomer is described as a terpolymer of tetrafluoroethylene, propylene, and vinylidene fluoride. Such FKM elastomers tend to have improved base resistance. Some commercial embodiments contain about 67% weight fluorine. A fifth type of FKM elastomer may be described as a pentapolymer of tetrafluoroethylene, hexafluoropropylene, ethylene, and a fluorinated vinyl ether and vinylidene fluoride. Such elastomers typically have improved base resistance and have improved low temperature performance.

Another category of fluorocarbon elastomers is designated as FFKM. These elastomers may be designated as perfluoroelastomers because the polymers are completely fluorinated and contain no carbon hydrogen bond. As a group, the FFKM fluoroelastomers tend to have superior fluid resistance. They were originally introduced by DuPont under the Kalrez® trade name. Additional suppliers include Daikin and Ausimont.

A third category of fluorocarbon elastomer is designated as FTPM. Typical of this category are the copolymers of propylene and tetrafluoroethylene. The category is characterized by a high resistance to basic materials such as amines.

Suitable fluorocarbon elastomers include commercially available copolymers of one or more fluorine containing monomers, chiefly vinylidene fluoride (VDF), hexafluoropropylene (HFP), tetrafluoroethylene (TFE), and perfluorovinyl ethers (PFVE). Preferred PFVE include those with a $C_{1-8}$ perfluoroalkyl group, preferably perfluoroalkyl groups with 1 to 6 carbons, and particularly perfluoromethyl vinyl ether and perfluoropropyl vinyl ether. In addition, the copolymers may also contain repeating units derived from olefins such as ethylene (Et) and propylene (Pr).

In various preferred embodiments, the fluorocarbon elastomer is a so-called intrinsically base resistant fluorocarbon elastomer. Such elastomers include fluoroolefin co-polymers having a low content of vinylidene fluoride. In one embodiment, the elastomeric material is described chemically as a copolymer of tetrafluoroethylene and at least one $C_{2-4}$ olefin and further containing cure site monomer. Optionally, the elastomeric material contains repeating units derived from one or more additional fluorine-containing monomers. As such, the cured elastomeric material comprises repeating units derived from tetrafluoroethylene and at least one $C_{2-4}$ olefin, and further comprises peroxide crosslinks.

In a preferred embodiment, the elastomeric material comprises repeating units derived from 10-90 mole % tetrafluoroethylene, 10-90 mole % $C_{2-4}$ olefin, and up to 30 mole % of one or more additional fluorine-containing monomers. Preferably, the repeating units are derived from 25-90 mole % tetrafluoroethylene and 10-75 mole % $C_{2-4}$ olefin. In another preferred embodiment, the repeating units are derived from 45-65 mole % tetrafluoroethylene and 20-55 mole % $C_{2-4}$ olefin.

In a particularly preferred embodiment, the molar ratio of tetrafluoroethylene units to $C_{2-4}$ olefin repeating units is from 60:40 to 40:60. In various embodiments, the elastomeric material comprises alternating units of $C_{2-4}$ olefins and tetrafluoroethylene. In such polymers the molar ratio of tetrafluoroethylene to $C_{2-4}$ olefin is approximately 50:50.

In another embodiment, the elastomeric materials are provided as block copolymers having an A-B-A structure, wherein A represents a block of poly-tetrafluoroethylene and B represents a block of polyolefin.

A preferred $C_{2-4}$ olefin is propylene. Elastomeric materials based on copolymers of tetrafluoroethylene and propylene is commercially available, for example from Asahi under the Aflas® trade name.

A preferred additional monomer in the vulcanized elastomeric material is vinylidene difluoride. Other fluorine-containing monomers that may be used in the elastomeric materials of the invention include without limitation, perfluoroalkyl vinyl compounds, perfluoroalkyl vinylidene compounds, and perfluoroalkoxy vinyl compounds. Hexafluoropropylene (HFP) is an example of perfluoroalkyl vinyl monomer. Perfluoromethyl vinyl ether is an example of a preferred perfluoroalkoxy vinyl monomer. For example, rubbers based on copolymers of tetrafluoroethylene, ethylene, and perfluoromethyl vinyl ether are commercially available from DuPont under the Viton® ETP trade name.

Fluorocarbon elastomeric materials used to make the processable rubber compositions of the invention may typically be prepared by free radical emulsion polymerization of a monomer mixture containing the desired molar ratios of starting monomers. Initiators are typically organic or inorganic peroxide compounds, and the emulsifying agent is typically a fluorinated acid soap. The molecular weight of the polymer formed may be controlled by the relative amounts of initiators used compared to the monomer level and the choice of transfer agent if any. Typical transfer agents include carbon tetrachloride, methanol, and acetone. The emulsion polymerization may be conducted under batch or continuous conditions. Such fluoroelastomers are commercially available as noted above.

The fluorocarbon elastomers and cured fluorocarbon elastomers used in the compositions and methods of the invention contain repeating units derived from one or more fluorine containing olefinic monomers as described above. In a preferred embodiment, the peroxide cure elastomers further contain repeating units derived from so-called peroxide cure site monomers, which are described in further detail below. The repeating units are derived from the corresponding monomers in the sense that the structure of the polymer results from a copolymerization of the olefinic monomers and the resulting structure is recognized as the addition polymerization product of the monomers. In the cured elastomers, at least some of the repeating units derived from the cure site monomers contain so-called peroxide crosslinks. In one embodiment, the peroxide crosslinks are formed by the reaction of polyolefinic co-agents with radicals on the cure site monomers induced by the action of the peroxide component of the radical curing system.

In various embodiments, the peroxide curable fluorocarbon elastomers contain up to 5 mole % and preferably up to 3 mole % of repeating units derived from the so-called cure site monomers. In one embodiment, the cure site repeating units are derived from halogen-containing olefin monomers, wherein the halogen is chlorine, bromine, iodine, or combinations of any of them. If used, preferably the repeating units of a halogen-containing olefin are present in a level to provide at least about 0.05% halogen in the polymer, preferably 0.3% halogen or more. In a preferred embodiment, the total weight of halogen in the polymer is 1.5 wt. % or less.

The cure site monomers provide sites on the elastomeric material that preferably react at a high rate with radical initiators such as peroxides. They react faster than other parts of the elastomer. Crosslinking thus occurs preferentially at the cure site monomers. This crosslinking action is responsible at least in part for development of elastomeric properties in the elastomer. Non-limiting examples of cure site monomers include brominated, chlorinated, and iodinated olefins; brominated, chlorinated, and iodinated unsaturated ethers; and non-conjugated dienes.

In preferred embodiments, the peroxide curable fluoroelastomers comprise at least one halogenated cure site or a reactive double bond resulting from the presence of a copolymerized unit of a non-conjugated diene. The double bond of the cure site monomer is referred to herein as an olefin. Functional groups associated with the cure sites thus include a carbon bromine (C—Br) bond, a carbon iodine (C—I) bond, a carbon chlorine (C—Cl) bond, and an olefin. In various embodiments, halogenated cure sites are provided by copolymerized cure site monomers and/or by halogen atoms that are present at terminal positions of the fluoroelastomer polymer chain. Generically, the halogenated cure sites are said to be repeating units derived from a cure site monomer. Co-polymerized cure site monomers, reactive double bonds, and halogenated end groups are capable of reacting to form crosslinks, especially under conditions of catalysis or initiation by the action of peroxides.

As is clear from this discussion, the repeating units of an uncured elastomer derived from the cure site monomers contain one or more of those functional groups. On the other hand, in cured elastomers, some of the functional groups will be reacted with the curing system. In both cases, it is said that the elastomer contains repeating units derived from peroxide cure site monomers.

Brominated cure site monomers may contain other halogens, preferably fluorine. Examples are bromotrifluoroethylene, 4-bromo-3,3,4,4-tetrafluorobutene-1 and others such as vinyl bromide, 1-bromo-2,2-difluoroethylene, perfluoroallyl bromide, 4-bromo-1,1,2-trifluorobutene, 4-bromo-1,1,3,3,4,4,-hexafluorobutene, 4-bromo-3-chloro-1,1,3,4,4-pentafluorobutene, 6-bromo-5,5,6,6-tetrafluorohexene, 4-bromoperfluorobutene-1 and 3,3-difluoroallyl bromide. Brominated unsaturated ether cure site monomers useful in the invention include ethers such as 2-bromo-perfluoroethyl perfluorovinyl ether and fluorinated compounds of the class $CF_2 Br—R_f—O—CF=CF_2$ ($R_f$ is perfluoroalkylene), such as $CF_2BrCF_2O—CF=CF_2$, and fluorovinyl ethers of the class $ROCF=CFBr$ or $ROCBr=CF_2$, where R is a lower alkyl group or fluoroalkyl group, such as $CH_3OCF=CFBr$ or $CF_3CH_2OCF=CFBr$.

Iodinated olefins may also be used as cure site monomers. Suitable iodinated monomers include iodinated olefins of the formula: $CHR=CH-Z-CH_2CHR—I$, wherein R is —H or —$CH_3$; Z is a $C_1$-$C_{18}$ (per)fluoroalkylene radical, linear or branched, optionally containing one or more ether oxygen atoms, or a (per)fluoropolyoxyalkylene radical as disclosed in U.S. Pat. No. 5,674,959. Other examples of useful iodinated cure site monomers are unsaturated ethers of the formula: $I(CH_2CF_2CF_2)_nOCF=CF_2$ and $ICH_2 CF_2O[CF(CF_3)CF_2O]_n CF=CF_2$, and the like, wherein n=1-3, such as disclosed in U.S. Pat. No. 5,717,036. In addition, suitable iodinated cure site monomers including iodoethylene, 4-iodo-3,3,4,4-tetrafluorobutene-1; 3-chloro-4-iodo-3,4,4-trifluorobutene; 2-iodo-1,1,2,2-tetrafluoro-1-(vinyloxy)ethane; 2-iodo-1-(perfluorovinyloxy)-1,1,2,2-tetrafluoroethylene; 1,1,2,3,33-hexafluoro-2-iodo-1-(perfluorovinyloxy)propane; 2-iodoethyl vinyl ether; 3,3,4,5,5,5-hexafluoro-4-iodopentene; and iodotrifluoroethylene are disclosed in U.S. Pat. No. 4,694,045.

Examples of non-conjugated diene cure site monomers include 1,4-pentadiene, 1,5-hexadiene, 1,7-octadiene and others, such as those disclosed in Canadian Patent 2,067,891. A suitable triene is 8-methyl-4-ethylidene-1,7-octadiene.

Of the cure site monomers listed above, preferred compounds include 4-bromo-3,3,4,4-tetrafluorobutene-1; 4-iodo-3,3,4,4-tetrafluorobutene-1; and bromotrifluoroethylene.

Additionally, or alternatively, cure site monomers and repeating units derived from them containing iodine, bromine or mixtures thereof are present at the fluoroelastomer chain ends as a result of the use of chain transfer or molecular weight regulating agents during preparation of the fluoroelastomers. Such agents include iodine-containing compounds that result in bound iodine at one or both ends of the polymer molecules. Methylene iodide; 1,4-diiodoperfluoro-n-butane; and 1,6-diiodo-3,3,4,4,tetrafluorohexane are representative of such agents. Other iodinated chain transfer agents include 1,3-diiodoperfluoropropane; 1,4-diiodoperfluorobutane; 1,6-diiodoperfluorohexane; 1,3-diiodo-2-chloroperfluoropropane; 1,2-di(iododifluoromethyl)perfluorocyclobutane; monoiodoperfluoroethane; monoiodoperfluorobutane; and 2-iodo-1-hydroperfluoroethane. Particularly preferred are diiodinated chain transfer agents. Examples of brominated chain transfer agents include 1-bromo-2-iodoperfluoroethane; 1-bromo-3-iodoperfluoropropane; 1-iodo-2-bromo-1,1-difluoroethane and others such as disclosed in U.S. Pat. No. 5,151,492.

Non-limiting examples of peroxide curable fluorocarbon elastomers include VDF/HFP/CSM, VDF/HFP/TFE/CSM, VDF/PFVE/TFE/CSM, TFE/Pr/CSM, TFE/Pr/VDF/CSM, TFE/Et/PFVE/VDF/CSM, TFE/Et/PFVE/CSM and TPE/PFVE/CSM, where CSM represents at least one peroxide cure site monomer. The elastomer designation gives the monomers from which the elastomer gums are synthesized. In some embodiments, the elastomer gums have viscosities that give a Mooney viscosity in the range generally of 15-160 (ML1+10, large rotor at 121° C.), which can be selected for a combination of flow and physical properties. Elastomer suppliers include Dyneon (3M), Asahi Glass Fluoropolymers, Solvay/Ausimont, DuPont, and Daikin.

A wide variety of thermoplastic polymeric materials can be used in the invention. In one embodiment, the thermoplastic polymeric material used is a thermoplastic elastomer. Preferred thermoplastic elastomers include those having a crystalline melting point of 120° C. or higher, preferably 150° C. or higher, and more preferably 200° C. or higher.

Thermoplastic elastomers have some physical properties of rubber, such as softness, flexibility and resilience, but can be processed like thermoplastics. A transition from a melt to a solid rubber-like composition occurs fairly rapidly upon cooling. This is in contrast to convention elastomers, which hardens slowly upon heating. Thermoplastic elastomers may be processed on conventional plastic equipment such as injection molders and extruders. Scrap may generally be readily recycled.

Thermoplastic elastomers have a multi-phase structure, wherein the phases are generally intimately mixed. In many cases, the phases are held together by graft or block copolymerization. At least one phase is made of a material that is hard at room temperature but fluid upon heating. Another phase is a softer material that is rubber like at room temperature.

Some thermoplastic elastomers have an A-B-A block copolymer structure, where A represents hard segments and B is a soft segment. Because most polymeric material tend to be incompatible with one another, the hard and soft segments of thermoplastic elastomers tend to associate with one another to form hard and soft phases. For example, the hard segments tend to form spherical regions or domains dispersed in a continuous elastomer phase. At room temperature, the domains are hard and act as physical crosslinks tying together elastomeric chains in a 3-D network. The domains tend to lose strength when the material is heated or dissolved in a solvent.

Other thermoplastic elastomers have a repeating structure represented by $(A-B)_n$, where A represents the hard segments and B the soft segments as described above.

Many thermoplastic elastomers are known. They in general adapt either an A-B-A triblock structure or an $(A-B)_n$ repeating structure. Non-limiting examples of A-B-A type thermoplastic elastomers include polystyrene/polysiloxane/polystyrene, polystyrene/polyethylene-co-butylene/polystyrene, polystyrene/polybutadiene polystyrene, polystyrene/polyisoprene/polystyrene, poly-α-methyl styrene/polybutadiene/poly-α-methyl styrene, poly-α-methyl styrene/polyisoprene/poly-α-methyl styrene, and polyethylene/polyethylene-co-butylene/polyethylene.

Non-limiting examples of thermoplastic elastomers having a $(A-B)_n$ repeating structure include polyamide/polyether, polysulfone/polydimethylsiloxane, polyurethane/polyester, polyurethane/polyether, polyester/polyether, polycarbonate/polydimethylsiloxane, and polycarbonate/polyether. Among the most common commercially available thermoplastic elastomers are those that contain polystyrene as the hard segment. Triblock elastomers are available with polystyrene as the hard segment and either polybutadiene, polyisoprene, or polyethylene-co-butylene as the soft segment. Similarly, styrene butadiene repeating co-polymers are commercially available, as well as polystyrene/polyisoprene repeating polymers.

In a preferred embodiment, a thermoplastic elastomer is used that has alternating blocks of polyamide and polyether. Such materials are commercially available, for example from Atofina under the Pebax® trade name. The polyamide blocks may be derived from a copolymer of a diacid component and a diamine component, or may be prepared by homopolymerization of a cyclic lactam. The polyether block is generally derived from homo- or copolymers of cyclic ethers such as ethylene oxide, propylene oxide, and tetrahydrofuran.

The thermoplastic polymeric material may also be selected from among solid, generally high molecular weight, plastic materials. In one embodiment, the materials are crystalline or semi-crystalline polymers, preferably having a crystallinity of at least 25 percent as measured by differential scanning calorimetry. Amorphous polymers with a suitably high glass transition temperature are also acceptable as the thermoplastic polymeric material. In a preferred embodiment, the thermoplastic has a melt temperature or a glass transition temperature in the range from about 80° C. to about 350° C., but the melt temperature should generally be lower than the decomposition temperature of the thermoplastic vulcanizate. In various embodiments, the melting point of crystalline or semi-crystalline polymers is 120° C. or higher, preferably 150° C. or higher, and more preferably 200° C. or higher. Suitable thermoplastic materials include both fluoroplastics and non-fluoroplastics.

Non-limiting examples of thermoplastic polymers include polyolefins, polyesters, nylons, polycarbonates, styrene-acrylonitrile copolymers, polyethylene terephthalate, polybutylene terephthalate, polyamides including aromatic polyamides, polystyrene, polystyrene derivatives, polyphenylene oxide, polyoxymethylene, and fluorine-containing thermoplastics. Polyolefins are formed by polymerizing α-olefins such as, but not limited to, ethylene, propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene or ethylene or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof are also contemplated. These homopolymers and copolymers, and blends of them, may be incorporated as the thermoplastic polymeric material of the invention.

Polyester thermoplastics contain repeating ester linking units in the polymer backbone. In one embodiment, they contain repeating units derived from low molecular weight diols and low molecular weight aromatic diacids. Non-limiting examples include the commercially available grades of polyethylene terephthalate and polybutylene terephthalate. Alternatively, the polyesters may be based on aliphatic diols and aliphatic diacids. Exemplary here the copolymers of ethylene glycol or butanediol with adipic acid. In another embodiment, the thermoplastic polyesters are polylactones, prepared by polymerizing a monomer containing both hydroxyl and carboxyl functionality. Polycaprolactone is a non-limiting example of this class of thermoplastic polyester.

Polyamide thermoplastics contain repeating amide linkages in the polymer backbone. In one embodiment, the polyamides contain repeating units derived from diamine and diacid monomers such as the well known nylon 66, a polymer of hexamethylene diamine and adipic acid. Other nylons have structures resulting from varying the size of the diamine and diacid components. Non-limiting examples include nylon 610, nylon 612, nylon 46, and nylon 6/66 copolymer. In another embodiment, the polyamides have a structure resulting from polymerizing a monomer with both amine and carboxyl functionality. Non-limiting examples include nylon 6 (polycaprolactam), nylon 11, and nylon 12.

Other polyamides made from diamine and diacid components include the high temperature aromatic polyamides containing repeating units derived from diamines and aromatic diacids such as terephthalic acid. Commercially available examples of these include PA6T (a copolymer of hexanediamine and terephthalic acid), and PA9T (a copolymer of nonanediamine and terephthalic acid), sold by Kuraray under the Genestar tradename. For some applications, the melting point of some aromatic polyamides may be higher than optimum for thermoplastic processing. In such cases, the melting point may be lowered by preparing appropriate copolymers. In a non-limiting example, in the case of PA6T, which has a melting temperature of about 370° C., it is possible to in effect lower the melting point to below a moldable temperature of 320° C. by including an effective amount of a non-aromatic diacid such as adipic acid when making the polymer.

In another preferred embodiment, an aromatic polyamide is used based on a copolymer of an aromatic diacid such as terephthalic acid and a diamine containing greater than 6 carbon atoms, preferably containing 9 carbon atoms or more. The upper limit of the length of the carbon chain of the diamine is limited from a practical standpoint by the availability of suitable monomers for the polymer synthesis. As a rule, suitable diamines include those having from 7 to 20 carbon atoms, preferably in the range of 9 to 15 carbons, and more preferably in the range from 9 to 12 carbons. Preferred embodiments include C9, C10, and C11 diamine based aromatic polyamides. It is believed that such aromatic polyamides exhibit an increase level of solvent resistance based on the oleophilic nature of the carbon chain having greater than 6 carbons. If desired to reduce the melting point below a preferred molding temperature (typically 320° C. or lower), the aromatic polyamide based on diamines of greater than 6 carbons may contain an effective amount of a non-aromatic diacid, as discussed above with the aromatic polyamide based on a 6 carbon diamine. Such effective amount of diacid should be enough to lower the melting point into a desired molding temperature range, without unacceptably affecting the desired solvent resistance properties.

Other non-limiting examples of high temperature thermoplastics include polyphenylene sulfide, liquid crystal polymers, and high temperature polyimides. Liquid crystal polymers are based chemically on linear polymers containing repeating linear aromatic rings. Because of the aromatic structure, the materials form domains in the nematic melt state with a characteristic spacing detectable by x-ray diffraction methods. Examples of materials include copolymers of hydroxybenzoic acid, or copolymers of ethylene glycol and linear aromatic diesters such as terephthalic acid or naphthalene dicarboxylic acid.

High temperature thermoplastic polyimides include the polymeric reaction products of aromatic dianhydrides and aromatic diamines. They are commercially available from a number of sources. Exemplary is a copolymer of 1,4-benzenediamine and 1,2,4,5-benzenetetracarboxylic acid dianhydride.

In a preferred embodiment, the thermoplastic polymeric material comprises a fluorocarbon thermoplastic polymer, also referred to as a "fluoroplastic". Commercial embodiments are available that contain 59 to 76% by weight fluorine. They may either be fully fluorinated or partially fluorinated. In various other preferred embodiments, the thermoplastic is selected from thermoplastic elastomers, high molecular weight plastic materials, and other thermoplastic polymeric materials that do not contain fluorine. Mixtures of fluoroplastics and non-fluoroplastics may also be used.

Fully fluorinated thermoplastic polymers include copolymers of tetrafluoroethylene and perfluoroalkyl vinyl ethers. The perfluoroalkyl group is preferably of 1 to 6 carbon atoms. Examples of copolymers are PFA (copolymer of TFE and perfluoropropyl vinyl ether) and MFA (copolymer of TFE and perfluoromethyl vinyl ether). Other examples of fully fluorinated thermoplastic polymers include copolymers of TFE with perfluoro olefins of 3 to 8 carbon atoms. Non-limiting examples include FEP (copolymer of TFE and hexafluoropropylene).

Partially fluorinated thermoplastic polymers include E-TFE (copolymer of ethylene and TFE), E-CTFE (copolymer of ethylene and chlorotrifluoroethylene), and PVDF (polyvinylidene fluoride). A number of thermoplastic copolymers of vinylidene fluoride are also suitable thermoplastic polymers for use in the invention. These include, without limitation, copolymers with perfluoroolefins such as hexafluoropropylene, and copolymers with chlorotrifluoroethylene. Thermoplastic terpolymers may also be used. These include thermoplastic terpolymers of TFE, HFP, and vinylidene fluoride. Fully fluorinated fluoroplastics are characterized by relatively high melting points, when compared to the vinylidene fluoride based thermoplastics that are also included in the fluoroplastic blend of the invention. As examples, PFA has a melting point of about 305° C., MFA has a melting point of 280-290° C., and FEP has a melting point of about 260-290° C. The melting point of individual grades depends on the exact structure, processing conditions, and other factors, but the values given here are representative.

Partially fluorinated fluoroplastics such as the vinylidene fluoride homo- and copolymers described above have relatively lower melting points than the fully fluorinated fluoroplastics. For example, polyvinylidene fluoride has a melting point of about 160-170° C. Some copolymer thermoplastics have an even lower melting point, due to the presence of a small amount of co-monomer. For example, a vinylidene fluoride copolymer with a small amount of hexafluoropropylene, exemplified in a commercial embodiment such as the Kynar Flex series, exhibits a melting point in the range of about 105-160° C., and typically about 130° C. These low melting points lead to advantages in thermoplastic processing, as lower temperatures of melting lead to lower energy costs and avoidance of the problem of degradation of cured elastomers in the compositions.

In various embodiments, peroxide curable fluorocarbon elastomers such as described above are dynamically cured with a combination of radical curing system and phenol based curing systems. In one embodiment, the curing systems are combined with peroxide curable elastomer, optional other elastomers, and a thermoplastic material, while shear and heat are applied to blend the combination and cure the elastomers.

The radical curing system contains a radical initiator and a crosslinking co-agent, and normally further includes an acid acceptor such as ZnO to accelerate the cure. The radical initiator is believed to function by first extracting a hydrogen or halogen atom from the fluorocarbon elastomer to create a free radical that can be crosslinked. It is believed that the cure site monomers described above provide sites that react with the radical initiator at an accelerated rate, so that subsequent crosslinking described below occurs mainly at the cure sites. Crosslinking co-agents are normally included in the radical curing system. They contain at least two sites of olefinic unsaturation, which react with the free radical on the fluorocarbon elastomer molecule generated by the reaction of the initiator.

In various embodiments, the initiators have peroxide functionality. As examples of initiators, a wide range of organic peroxides is known and commercially available. The initiators, including the organic peroxides, are activated over a wide range of temperatures. The activation temperature may be described using a parameter known as half-life. Typically values for half-lives of, for example, 0.1 hours, 1 hour, and 10 hours are given in degrees centigrade. For example a $T_{1/2}$ at 0.1 hours of 143° C. indicates that at that temperature, half of the initiator will decompose within 0.1 hours. Organic peroxides with a $T_{1/2}$ at 0.1 hours from 118° C. to 228° C. are commercially available. Such peroxides have a half-life of at least 0.1 hours at the indicated temperatures. The $T_{1/2}$ values indicate the kinetics of the initial reaction in crosslinking the fluorocarbon elastomers, that is decomposition of the peroxide to form a radical containing intermediate.

In some embodiments, it is preferred to match the $T_{1/2}$ of the initiator such as an organic peroxide to the temperature of the molten material into which the curing composition is to be added. In various embodiments, the initiator has a thermal stability such that the half-life is at least 0.1 hours at temperatures of 180° C. or higher. In other embodiments, suitable initiators have a half-life of 0.1 hours at 190° C. or higher, or at temperatures of 200° C. or higher. Non-limiting examples of peroxides and their $T_{1/2}$ for a half-life of 0.1 hours include Trigonox 145-E85 ($T_{1/2}$=182° C.), Trigonox M55 ($T_{1/2}$=183° C.), Trigonox K-90 ($T_{1/2}$=195° C.), Trigonox A-W70 ($T_{1/2}$=207° C.), and Trigonox TAHP-W85 ($T_{1/2}$=228° C.). A non-limiting example of a non-peroxide initiator is Perkadox-30 ($T_{1/2}$=284° C.). The Trigonox and Perkadox materials are commercial or developmental products of AkzoNobel.

Non-limiting examples of commercially available organic peroxides for initiating the cure of fluorocarbon elastomers include butyl 4,4-di-(tert-butylperoxy)valerate; tert-butyl peroxybenzoate; di-tert-amyl peroxide; dicumyl peroxide; di-(tert-butylperoxyisopropyl)benzene; 2,5-dimethyl-2,5-di (tert-butylperoxy)hexane; tert-butyl cumyl peroxide; 2,5,-dimethyl-2,5-di(tert-butylperoxy)hexyne-3; di-tert-butyl peroxide; 3,6,9-triethyl-3,6,9-trimethyl-1,4,7-triperoxonane; 1,1,3,3-tetramethylbutyl hydroperoxide; diisopropylbenzene monohydroperoxide; cumyl hydroperoxide; tert-butyl hydroperoxide; tert-amyl hydroperoxide; tert-butyl peroxyisobutyrate; tert-amyl peroxyacetate; tert-butylperoxy stearyl carbonate; di(1-hydroxycyclohexyl)peroxide; ethyl 3,3-di(tert-butylperoxy)butyrate; and tert-butyl 3-isopropenylcumyl peroxide.

Non-limiting examples of crosslinking co-agents include triallyl cyanurate; triallyl isocyanurate; tri(methallyl)-isocyanurate; tris(diallylamine)-s-triazine, triallyl phosphite; N,N-diallyl acrylamide; hexaallyl phosphoramide; N,N,N',N'-tetraallyl terephthalamide; N,N,N',N'-tetraallyl malonamide; trivinyl isocyanurate; 2,4,6-trivinyl methyltrisiloxane; and tri (5-norbornene-2-methylene)cyanurate. The crosslinking co-agents preferably contain at least two sites of olefinic unsaturation. The sites of unsaturation react with the free radical generated on the fluorocarbon elastomer molecule and crosslink the elastomer. A commonly used crosslinking agent is triallylisocyanurate (TAIC).

Another group of fluorocarbon elastomers is curable by the action of various polyols. Curing with the polyol crosslinking agents is also referred to as phenol cure because phenols are commonly used polyols for the purpose. Many of the fluorocarbon elastomers that can be cured with polyols can also be cured with peroxides. However, the relative cure rate by a peroxide or radical curing system is quite low if the elastomer does not contain peroxide cure sites such as described above. Under conditions at which polymers containing cure sites are efficiently crosslinked, phenol curable elastomers lacking peroxide cure sites are cured much less or not at all in the presence of a radical curing system. The curability with either of the curing systems, and the relative rates of cure, depend on conditions during the dynamic vulcanization described below.

Phenol or polyol curative systems for fluorocarbon elastomers contain onium salts and one or more polyol crosslinking agents. In addition, crosslinking by phenol and polyol agents is accelerated by the presence in mixtures of phenol curing accelerators or curing stabilizers. Commonly used curing accelerators include acid acceptor compounds such as oxides and hydroxides of divalent metals. Non-limiting examples include calcium hydroxide, magnesium oxide, calcium oxide, and zinc oxide. In many embodiments, the rate of cure by phenol curing agents is significantly reduced when the acid acceptor compounds are not present in mixtures being dynamically vulcanized. In other words, even though a commercial embodiment may contain a phenol curable elastomer and a phenol and onium curing agent incorporated into the elastomer, the rate of phenol cure will nevertheless be very slow or nonexistent if the mixture contains no added acid acceptor compounds.

Suitable onium salts are described, for example, in U.S. Pat. Nos. 4,233,421; 4,912,171; and 5,262,490, each of which is incorporated by reference. Examples include triphenylbenzyl phosphonium chloride, tributyl alkyl phosphonium chloride, tributyl benzyl ammonium chloride, tetrabutyl ammonium bromide, and triarylsulfonium chloride.

Another class of useful onium salts is represented by the following Formula:

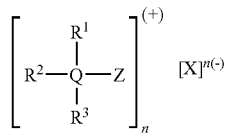

where

Q is nitrogen or phosphorus;

Z is a hydrogen atom or is a substituted or unsubstituted, cyclic or acyclic alkyl group having from 4 to about 20 carbon atoms that is terminated with a group of the formula —COOA where A is a hydrogen atom or a $NH_4^+$ cation or Z is a group of the formula —$CY_2$COOR' where Y is a hydrogen or halogen atom, or is a substituted or unsubstituted alkyl or aryl group having from 1 to about 6 carbon atoms that may optionally contain one or more quaternary heteroatoms and where R' is a hydrogen atom, a $NH_4^+$ cation, an alkyl group, or is an acyclic anhydride, e.g., a group of the formula —COR where R is an alkyl group or is a group that itself contains organo-onium (i.e., giving a bis-organo-onium); preferably R' is hydrogen; Z may also be a substituted or unsubstituted, cyclic or acyclic alkyl group having from 4 to about 20 carbon atoms that is terminated with a group of the formula —COOA where A is a hydrogen atom or is a $NH_4^+$ cation;

$R_1$, $R_2$, and $R_3$ are each, independently, a hydrogen atom or an alkyl, aryl, alkenyl, or any combination thereof, each $R_1$, $R_2$, and $R_3$ can be substituted with chlorine, fluorine, bromine, cyano, —OR", or —COOR" where R" is a $C_1$ to $C_{20}$ alkyl, aryl, aralkyl, or alkenyl, and any pair of the $R_1$, $R_2$, and $R_3$ groups can be connected with each other and with Q to form a heterocyclic ring; one or more of the $R_1$, $R_2$, and $R_3$ groups may also be a group of the Formula Z where Z is as defined above;

X is an organic or inorganic anion (for example, without limitation, halide, sulfate, acetate, phosphate, phosphonate, hydroxide, alkoxide, phenoxide, or bisphenoxide); and n is a number equal to the valence of the anion X.

The polyol crosslinking agents may be any of those polyhydroxy compounds known in the art to function as a crosslinking agent or co-curative for fluoroelastomers, such as those polyhydroxy compounds disclosed in U.S. Pat. No. 4,259,463 (Moggi et al.), U.S. Pat. No. 3,876,654 (Pattison), U.S. Pat. No. 4,233,421 (Worm), and U.S. Defensive Publication T107,801 (Nersasian). Preferred polyols incude aromatic polyhydroxy compounds, aliphatic polyhydroxy compounds, and phenol resins.

Representative aromatic polyhydroxy compounds include any one of the following: di-, tri-, and tetrahydroxybenzenes, -naphthalenes, and -anthracenes, and bisphenols of the Formula

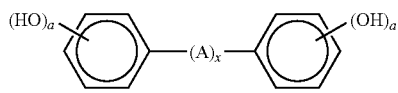

wherein A is a difunctional aliphatic, cycloaliphatic, or aromatic radical of 1 to 13 carbon atoms, or a thio, oxy, carbonyl, or sulfonyl radical, A is optionally substituted with at least one chlorine or fluorine atom, x is 0 or 1, a is independently 1 or 2, and any aromatic ring of the polyhydroxy compound is optionally substituted with at least one atom of chlorine, fluorine, or bromine atom, or carboxyl or an acyl radical (e.g., —COR, where R is H or a $C_1$ to $C_8$ alkyl, aryl or cycloalkyl group) or alkyl radical with, for example, 1 to 8 carbon atoms. It will be understood from the above bisphenol Formula III that the —OH groups can be attached in any position (other than number one) in either ring. Blends of two or more such compounds can also be used. A preferred bisphenol compound is Bisphenol AF, which is 2,2-bis(4-hydroxyphenyl) hexafluoropropane. Other non-limiting examples include 4,4'-dihydroxydiphenyl sulfone (Bisphenol S) and 2,2-bis(4-hydroxyphenyl)propane (Bisphenol A). Aromatic polyhydroxy compound, such as hydroquinone may also be used as curative agents. Further non-limiting examples include catechol, resorcinol, 2-methyl resorcinol, 5-methyl resorcinol, 2-methyl hydroquinone, 2,5-dimethyl hydroquinone, and 2-t-butyl hydroquinone, 1,5-dihydroxynaphthalene and 9,10-dihydroxyanthracene.

Aliphatic polyhydroxy compounds may also be used as a polyol curative. Examples include fluoroaliphatic diols, e.g., 1,1,6,6-tetrahydrooctafluorohexanediol, and others such as those described in U.S. Pat. No. 4,358,559 (Holcomb et al.) and references cited therein. Derivatives of polyhydroxy compounds can also be used such as those described in U.S. Pat. No. 4,446,270 (Guenthner et al.) and include, for example, 2-(4-allyloxyphenyl)-2-(4-hydroxyphenyl)propane. Mixtures of two or more of the polyhydroxy compounds can be used.

Phenol resins capable of crosslinking a rubber polymer can be employed as the polyol curative agent. Reference to phenol resin may include mixtures of these resins. U.S. Pat. Nos. 2,972,600 and 3,287,440 are incorporated herein in this regard. These phenolic resins can be used to obtain the desired level of cure without the use of other curatives or curing agents.

Phenol resin curatives can be made by the condensation of alkyl substituted phenols or unsubstituted phenols with aldehydes, preferably formaldehydes, in an alkaline medium or by condensation of bi-functional phenoldialcohols. The alkyl substituents of the alkyl substituted phenols typically contain 1 to about 10 carbon atoms. Dimethylolphenols or phenolic resins, substituted in para-positions with alkyl groups containing 1 to about 10 carbon atoms, are preferred. Useful commercially available phenol resins include alkylphenol-formaldehyde resin, and bromomethylated alkylphenol-formaldehyde resins.

In one embodiment, phenol resin curative agents are represented by the general formula

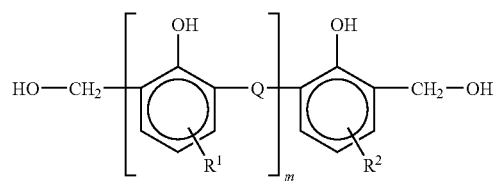

where Q is a divalent radical selected from the group consisting of —$CH_2$— and —$CH_2$—O—$CH_2$—; m is zero or a positive integer from 1 to 20 and R' is hydrogen or an organic radical. Preferably, Q is the divalent radical —CH$_2$—O—CH$_2$—, m is zero or a positive integer from 1 to 10, and R' is hydrogen or an organic radical having less than 20 carbon atoms. In another embodiment, preferably m is zero or a positive integer from 1 to 5 and R' is an organic radical having between 4 and 12 carbon atoms. Other preferred phenol resins are also defined in U.S. Pat. No. 5,952,425, which is incorporated herein by reference.

In various embodiments, phenol curable fluorocarbon elastomers include those based on copolymers containing vinylidene fluoride. It is believed that the methylene group of the vinylidene fluoride monomer provides a site of attack by the phenol crosslinking agent. Accordingly, curable compositions include vinylidene fluoride polymers.

In a preferred embodiment, plasticizers, extender oils, synthetic processing oils, or a combination thereof may be used in the compositions of the invention. The type of processing oil selected will typically be consistent with that ordinarily used in conjunction with the specific rubber or rubbers present in the composition. The extender oils may include, but are not limited to, aromatic, naphthenic, and paraffinic extender oils. Preferred synthetic processing oils include polylinear α-olefins. The extender oils may also include organic esters, alkyl ethers, or combinations thereof. Addition of certain low to medium molecular weight organic esters and alkyl ether esters to the compositions of the invention lowers the Tg of the polyolefin and rubber components, and of the overall composition, and improves low temperature properties, particularly flexibility and strength. These organic esters and alkyl ether esters generally have a molecular weight less than about 10,000. Particularly suitable esters include monomeric and oligomeric materials having an average molecular weight below about 2000, and preferably below about 600. In one embodiment, the esters are selected from aliphatic mono- or diesters, oligomeric aliphatic esters, and alkyl ether esters.

In addition to the elastomeric material, the thermoplastic polymeric material, and curative, the processable rubber compositions of this invention may include other additives such as stabilizers processing aids, curing accelerators, fillers, pigments, adhesives, tackifiers, and waxes. The properties of the compositions and articles of the invention may be modified, either before or after vulcanization, by the addition of ingredients that are conventional in the compounding of rubber, thermoplastics, and blends thereof.

A wide variety of processing aids may be used, including plasticizers and mold release agents. Non-limiting examples of processing aids include Caranuba wax, phthalate ester plasticizers such as dioctylphthalate (DOP) and dibutylphthalate silicate (DBS), fatty acid salts such zinc stearate and sodium stearate, polyethylene wax, and keramide. In some embodiments, high temperature processing aids are preferred. Such include, without limitation, linear fatty alcohols such as blends of C$_{10}$-C$_{28}$ alcohols, organosilicones, and functionalized perfluoropolyethers. In some embodiments, the compositions contain about 1 to about 15% by weight processing aids, preferably about 5 to about 10% by weight.

Acid acceptor compounds are commonly used as curing accelerators or curing stabilizers. Preferred acid acceptor compounds include oxides and hydroxides of divalent metals. Non-limiting examples include Ca (OH)$_2$, MgO, CaO, and ZnO. Zinc oxide is preferred for use with radical systems, while the magnesium and calcium oxides are preferred for the polyol curing system.

Non-limiting examples of fillers include both organic and inorganic fillers such as barium sulfate, calcium silicate, zinc sulfide, carbon black, graphite, PTFE powder, silica, titanium dioxide, clay, talc, fiber glass, fumed silica and discontinuous fibers such as mineral fibers, ultrahigh molecular weight polyethylene fiber, calcium silicate fibers, wood cellulose fibers, carbon fiber, boron fiber, and aramid fiber (such as Kevlar®). In various embodiments, fillers such as PTFE powder, graphite, calcium silicate, and calcium silicate fibers are used to enhance the wear resistance and other properties of shaped articles intended for use as dynamic sealing members. Some non-limiting examples of processing additives include stearic acid and lauric acid. The addition of carbon black, extender oil, or both, preferably prior to dynamic vulcanization, is particularly preferred. Non-limiting examples of carbon black fillers include SAF black, HAF black, SRP black and Austin black. Carbon black improves the tensile strength, and an extender oil can improve processability, resistance to oil swell, heat stability, hysteresis, cost, and permanent set. In a preferred embodiment, fillers such as carbon black may make up to about 40% by weight of the total weight of the compositions of the invention. Preferably, the compositions comprise 1-40 weight % of filler. In other embodiments, the filler makes up 10 to 25 weight % of the compositions.

The vulcanized elastomeric material, also referred to herein generically as a "rubber," is generally present as small particles within a continuous thermoplastic polymer matrix. A co-continuous morphology is also possible depending on the amount of elastomeric material relative to thermoplastic material, the cure system, the mechanism and degree of cure of the elastomer, and the amount and degree of mixing. Preferably, the elastomeric material is fully crosslinked/cured.

Crosslinking or curing is achieved by adding an appropriate dual curative system containing both a radical curing system and a phenol curing system to a blend of a thermoplastic material and an elastomeric material comprising at least one peroxide curable fluorocarbon elastomer, and then vulcanizing the rubber to the desired degree. In a preferred embodiment, the elastomer is crosslinked by a process of dynamic vulcanization. The term dynamic vulcanization refers to a vulcanization or curing process for a rubber contained in a thermoplastic composition, wherein the curable rubber is vulcanized under conditions of high shear at a temperature above the melting point of the thermoplastic component. The rubber is thus simultaneously crosslinked and dispersed as particles within the thermoplastic matrix. Dynamic vulcanization is effected by mixing the elastomeric and thermoplastic components at elevated temperature in the presence of a curative in conventional mixing equipment such as roll mills, Moriyama mixers, Banbury mixers, Brabender mixers, continuous mixers, mixing extruders such as single and twin-screw extruders, and the like. An advantageous characteristic of dynamically cured compositions is that, notwithstanding the fact that the elastomeric component is fully cured, the compositions can be processed and reprocessed by conventional plastic processing techniques such as extrusion, injection molding and compression molding. Scrap or flashing can be salvaged and reprocessed.

Heating and mixing or mastication at vulcanization temperatures are generally adequate to complete the vulcanization reaction in a few minutes or less, but if shorter vulcanization times are desired, higher temperatures and/or higher shear may be used. A suitable range of vulcanization temperature is from about the melting temperature of the thermoplastic material (which is preferably about 120° C. or higher, more preferably 150° C. or higher) to about 300° C. or more. Without limitation, the range is from about 150° C. to about 250° C. A preferred range of vulcanization temperatures is from about 180° C. to about 220° C. It is preferred that mixing continue without interruption until vulcanization occurs or is complete.

If appreciable curing is allowed after mixing has stopped, an unprocessable thermoplastic vulcanizate may be obtained. In this case, a kind of post curing step may be carried out to complete the curing process. In some embodiments, the post curing takes the form of continuing to mix the elastomer and thermoplastic during a cool-down period.

After dynamic vulcanization, a homogeneous mixture is obtained, wherein the rubber is in the form of small dispersed particles essentially of an average particle size smaller than about 50 μm, preferably of an average particle size smaller than about 25 μm, more preferably of an average size smaller than about 10 μm or less, and still more preferably of an average particle size of 5 μm or less.

The progress of the vulcanization may be followed by monitoring mixing torque or mixing energy requirements during mixing. The mixing torque or mixing energy curve generally goes through a maximum after which mixing can be continued somewhat longer to improve the fabricability of the blend. If desired, one can add additional ingredients, such as the stabilizer package, after the dynamic vulcanization is complete. The stabilizer package is preferably added to the thermoplastic vulcanizate after vulcanization has been essentially completed, i.e., the curative has been essentially consumed.

The processable rubber compositions of the invention may be manufactured in a batch process or a continuous process.

In a batch process, predetermined charges of peroxide curable elastomeric material, thermoplastic material and curative agents are added to a mixing apparatus. In an exemplary batch procedure, the elastomeric material and thermoplastic material are first mixed, blended, masticated or otherwise physically combined until a desired particle size of elastomeric material is provided in a continuous phase of thermoplastic material. When the structure of the elastomeric material is as desired, a curing system containing the radical initiator and crosslinking co-agent is then added while continuing to apply mechanical energy to mix the elastomeric material and thermoplastic material. Curing is effected by heating or continuing to heat the mixing combination of thermoplastic and elastomeric material in the presence of the curative agent.

Simultaneously or separately, a second curing system comprising a polyol or phenol crosslinker is added to the system. In various embodiments, the temperature is increased upon addition of the polyol curing system in order to accelerate cure. If desired, some but not all of the components of the respective curing systems are added to the elastomer/thermoplastic blend. Then, to initiate cure by the respective curing systems, the omitted component or components is/are added. For example, in the case of a radical curing system, the initiator, crosslinking co-agent, or acid acceptor can be omitted and later added to induce cure. For a polyol curing system, the polyol, onium salt, or the acid acceptor (preferably MgO or $Ca(OH)_2$) can be omitted and later added to induce cure.

In light of the above, various embodiments are contemplated for methods of making the processable rubber compositions. In one embodiment, the method comprises making a thermoplastic processable composition by dynamic cure of a fluorocarbon elastomer gum composition in a thermoplastic. The method comprises curing the fluorocarbon elastomer with both a polyol/phenol curing system and a radical/peroxide curing system. The fluorocarbon elastomer contains cure sites in addition to repeating units derived from fluoroolefins. The cure sites react with the radical curing systems during the dynamic cure.

In another embodiment, the method involves applying shear to an admixture of a fluorocarbon elastomer composition and a thermoplastic material, wherein the fluorocarbon elastomer composition comprises at least one peroxide curable fluoropolymer containing cure sites as described above. Then a peroxide curing system is added and shear is applied at a temperature where the crosslinking co-agent of the peroxide curing system reacts with the cure site to crosslink the elastomer. Then a phenol curing system is added and heat is applied at a temperature at which the phenol system reacts further with the fluorocarbon elastomer to provide a dual cured elastomer.

In another embodiment, a continuous process is provided wherein a fluorocarbon elastomer composition and a thermoplastic material are blended in a twin screw extruder. At a first port, a peroxide curing system is added and blending is continued at a first temperature to cure the fluorocarbon elastomer. At a second port downstream of the first, a phenol curing system is added and blending is continued at a second temperature to further cure the elastomer. In various embodiments, the second temperature is higher than the first temperature.

In another embodiment, a method involves combining a peroxide curable fluorocarbon elastomer (containing cure sites as discussed above), a phenol curing system, peroxide curing system, and a thermoplastic polymeric material. Shear is applied to the mixture at a first temperature at which the peroxide system reacts with the curable fluorocarbon elastomer to crosslink it. Thereafter, shear is applied at a second temperature where the phenol system reacts with the fluorocarbon elastomer. Normally, a peroxide curing system reacts to crosslink the fluorocarbon elastomer at a lower temperature than needed to cure the elastomer by a phenol mechanism at a significant rate. For this reason, sequential cure of the fluorocarbon elastomer can be accomplished at two different temperatures. Alternatively, shear can be applied to the mixture at a temperature at which the peroxide curing system and the phenol curing system react at appreciable rates simultaneously with the fluorocarbon elastomer.

In another embodiment, methods involve dynamically curing a composition containing a peroxide curable fluorocarbon elastomer, a radical curing system, a thermoplastic material, and no more than two components of a three part polyol curing system (i.e. no more than two of a phenol crosslinking agent, an onium compound, and an acid acceptor). Shear is applied to the dynamically curing mixture to crosslink or cure the fluorocarbon elastomer with the radical curing system. Then the omitted component(s) of the polyol curing system is (are) applied and shear is continued at a temperature where the fluorocarbon elastomer is further crosslinked by the phenol curing system.

In another embodiment, a method involves combining a first fluorocarbon elastomer containing cure sites for peroxide crosslinking, a thermoplastic material, a polyol curing system, and a second fluorocarbon elastomer containing no cure sites for peroxide crosslinking. Shear is applied to the combination to mix and form a dispersion at a first temperature. At this point, a peroxide curing system is added and shear is continued at a second temperature to crosslink the peroxide curable fluorocarbon elastomer containing cure sites. Later, the temperature is increased to a third temperature to effect cure of the first fluorocarbon elastomer by the phenol curing system. The phenol curing system also crosslinks and cures the second elastomer of the mixture that contains no cure sites. Alternatively in this embodiment, the phenol curing system is pre-incorporated into the second elastomer that contains no cure sites. Normally, commercially available cure incorporated phenol curable resins contain suitable amounts of phenol curing systems to cure both the peroxide curable elastomer and any second phenol curable elastomer present.

Methods of the invention involve double curing a fluorocarbon elastomer in the thermoplastic material. To carry out methods of the invention, components such as a fluorocarbon elastomer with cure sites, a peroxide curing system, a phenol curing system, and a thermoplastic material are combined in an order that permits either simultaneous, sequential, or partially sequential and partially simultaneous cure by both a radical curing system (e.g., peroxide) and a polyol curing system (e.g., phenol). A cure of the peroxide curable elastomers is effected by combining the radical curing system into an admixture of peroxide curable elastomer and thermoplastic, which is being sheared sufficiently to disperse the amorphous fluorocarbon elastomeric material throughout a continuous or co-continuous thermoplastic phase. Then the temperature is raised to a temperature at which the radical curing system is active. In general, individual organic initiators such as organic peroxides have characteristic temperatures at which they are activated or at which the rate of cure is suitably high. In general, an attack by the initiator, such as peroxide on a cure site of the curable elastomer creates free radicals which are then crosslinked by reaction with the crosslinking co-agent of the radical curing system. Before, during, or after the peroxide the peroxide curing, a phenol curing is also accomplished dynamically. In one embodiment, a phenol system is added first to the dynamic curing mixture. In various embodiments, phenol cure is complete before a peroxide curing system is added; in other embodiments, the phenol cure is partial before adding the peroxide.

In another embodiment, the phenol or polyol curing system is added at the same time as the peroxide or radical curing system. In various embodiments, the phenol curing system is added as separate components or is incorporated into a phenol curable fluorocarbon elastomer.

In another embodiment, the polyol curing system is added after the peroxide curing system. In one embodiment, a phenol crosslinker is already present in the mixture and an acid acceptor is added to effect cure. In another embodiment, an acid acceptor is already present in the mixture and a phenol crosslinker is added to effect cure. In another embodiment, neither component of a phenol curing system is present and both are added to effect cure.

To further illustrate and exemplify various embodiments of the invention, it is preferred to mix the elastomeric material and thermoplastic material at a temperature where the thermoplastic material softens and flows. If such a temperature is below that at which the curative agent is activated, the curative agent may be a part of the mixture during the initial particle dispersion step. In some embodiments, a curative is combined with the elastomeric and thermoplastic polymeric material at a temperature below the curing temperature. When the desired dispersion is achieved, the temperature may be increased to effect cure. However, if the curative agent is activated at the temperature of initial mixing, it is preferred to leave out the curative until the desired particle size distribution of the elastomeric material in the thermoplastic matrix is achieved. In another embodiment, curative is added after the elastomeric and thermoplastic materials are mixed. Thereafter, in a preferred embodiment, the curative agent is added to a mixture of elastomeric particles in thermoplastic material while the entire mixture continues to be mechanically stirred, agitated or otherwise mixed.

Continuous processes may also be used to prepare the processable rubber compositions of the invention. In a preferred embodiment, a twin screw extruder apparatus, either co-rotation or counter-rotation screw type, is provided with ports for material addition and reaction chambers made up of modular components of the twin screw apparatus. In an illustrative continuous procedure, thermoplastic material and elastomeric material are combined by inserting them into the screw extruder together in a first hopper using a feeder (loss-in-weight or volumetric feeder). Temperature and screw parameters are adjusted to provide a proper temperature and shear to effect the desired mixing and particle size distribution of an uncured elastomeric component in a thermoplastic material matrix. In various embodiments, the duration of mixing is controlled by providing a longer or shorter length of extrusion apparatus or by controlling the speed of screw rotation for the mixture of elastomeric material and thermoplastic material to go through during the mixing phase. The degree of mixing is controlled in various embodiments by the mixing screw element configuration in the screw shaft, such as intensive, medium or mild screw designs. Then, at a downstream port, by using a side feeder (loss-in-weight or volumetric feeder), the curative agent may be added continuously to the mixture of thermoplastic material and elastomeric material as it continues to travel down the twin screw extrusion pathway. Downstream of the curative additive port, the mixing parameters and transit time may be varied as described above. By adjusting the shear rate, temperature, duration of mixing, mixing screw element configuration, as well as the time of adding the curative agent, processable rubber compositions of the invention may be made in a continuous process.

The compositions and articles of the invention contain a sufficient amount of vulcanized elastomeric material ("rubber") to form a rubbery composition of matter; that is, they will exhibit a desirable combination of flexibility, softness, and compression set. Preferably, the compositions should comprise at least about 25 parts by weight rubber, preferably at least about 35 parts by weight rubber, even more preferably at least about 45 parts by weight rubber, and still more preferably at least about 50 parts by weight rubber per 100 parts by weight of the rubber and thermoplastic polymer combined. More specifically, the amount of cured rubber within the thermoplastic vulcanizate is generally from about 5 to about 95 percent by weight, preferably from about 35 to about 85 percent by weight, and more preferably from about 50 to about 80 percent by weight of the total weight of the rubber and the thermoplastic polymer combined.

The amount of thermoplastic polymer within the processable rubber compositions of the invention is generally from about 5 to about 95 percent by weight, preferably from about 15 to about 65 percent by weight and more preferably from about 20 to about 50 percent by weight of the total weight of the rubber and the thermoplastic combined.

As noted above, the processable rubber compositions and shaped articles of the invention include a cured rubber and a thermoplastic polymer. Preferably, the thermoplastic vulcanizate is a homogeneous mixture wherein the rubber is in the form of finely-divided and well-dispersed rubber particles within a non-vulcanized matrix. It should be understood, however, that the thermoplastic vulcanizates of the this invention are not limited to those containing discrete phases inasmuch as the compositions of this invention may also include other morphologies such as co-continuous morphologies. In especially preferred embodiments, the rubber particles have an average particle size smaller than about 50 µm, more preferably smaller than about 25 µm, even more preferably smaller than about 10 µm or less, and still more preferably smaller than about 5 µm.

The term vulcanized or cured rubber refers to a natural or synthetic rubber that has undergone at least a partial cure. The degree of cure can be measured by determining the amount of rubber that is extractable from the thermoplastic vulcanizate by using boiling xylene or cyclohexane as an extractant. This method is disclosed in U.S. Pat. No. 4,311,628. By using this method as a basis, the cured rubber of this invention will have a degree of cure where not more than 15 percent of the rubber is extractable, preferably not more than 10 percent of the rubber is extractable, and more preferably not more than 5 percent of the rubber is extractable. In an especially preferred embodiment, the elastomer is technologically fully vulcanized. The term fully vulcanized refers to a state of cure such that the crosslinked density is at least $7 \times 10^{-5}$ moles per ml of elastomer or that the elastomer is less than about three percent extractable by cyclohexane at 23° C.

The degree of cure can be determined by the cross-link density of the rubber. This, however, must be determined indirectly because the presence of the thermoplastic polymer interferes with the determination. Accordingly, the same rubber as present in the blend is treated under conditions with respect to time, temperature, and amount of curative that result in a fully cured product as demonstrated by its cross-link density. This cross-link density is then assigned to the blend similarly treated. In general, a cross-link density of about $7 \times 10^{-5}$ or more moles per milliliter of rubber is representative of the values reported for fully cured elastomeric copolymers. Accordingly, it is preferred that the compositions of this invention are vulcanized to an extent that corresponds to vulcanizing the same rubber as in the blend statically cured under pressure in a mold with such amounts of the same curative as in the blend and under such conditions of time and temperature to give a cross-link density greater than about $7 \times 10^{-5}$ moles per milliliter of rubber and preferably greater than about $1 \times 10^{-4}$ moles per milliliter of rubber.

Following cure, the processable rubber composition is removed from the reaction vessel (mixing chamber) for further processing. In various embodiments, further processing is by conventional thermoplastic processing techniques such as, without limitation, extrusion, blow molding, thermoforming, injection molding, casting, and compression molding. Although the processable compositions contain cured rubber particles and possess elastomeric properties, they can be thermoplastically processed by heating the material above a softening or flow temperature and extruding, casting, or molding the material, followed by cooling to form the shaped article. Advantageously, scrap produced during the thermoplastic processing can be readily remelted and reused.

Advantageously, the shaped articles of the invention are rubber-like materials that, unlike conventional rubbers, can be processed and recycled like thermoplastic materials. These materials are rubber like to the extent that they will retract to less than 1.5 times their original length within one minute after being stretched at room temperature to twice its original length and held for one minute before release, as defined in ASTM D1566. Also, these materials satisfy the tensile set requirements set forth in ASTM D412, and they also satisfy the elastic requirements for compression set per ASTM D395.

The reprocessability of the rubber compositions of the invention may be exploited to provide a method for reducing the costs of a manufacturing process for making shaped rubber articles. The method involves recycling scrap generated during the manufacturing process to make other new shaped articles. Because the compositions of the invention and the shaped articles made from the compositions are thermally processable, scrap may readily be recycled for re-use by collecting the scrap, optionally cutting, shredding, grinding, milling, otherwise comminuting the scrap material, and re-processing the material by conventional thermoplastic techniques. Techniques for forming shaped articles from the recovered scrap material are in general the same as those used to form the shaped articles—the conventional thermoplastic techniques include, without limitation, blow molding, injection molding, compression molding, and extrusion.

The re-use of the scrap material reduces the costs of the manufacturing process by reducing the material cost of the method. Scrap may be generated in a variety of ways during a manufacturing process for making shaped rubber articles. For example, off-spec materials may be produced. Even when on-spec materials are produced, manufacturing processes for shaped rubber articles tend to produce waste, either through inadvertence or through process design, such as the material in sprues of injection molded parts. The re-use of such materials through recycling reduces the overall costs of the manufacturing process.

For thermoset rubbers, such off spec and other waste materials usually can not be recycled into making more shaped articles, because the material can not be readily re-processed by the same techniques as were used to form the shaped articles in the first place. Recycling efforts in the case of thermoset rubbers are usually limited to grinding up the scrap and the using the grinds as raw material in a number of products other than those produced by the thermoplastic processing technique.

The invention has been described with regard to various embodiments. Further non-limiting description is given in the Examples that follow.

EXAMPLES

Viton® ETP 600S is a peroxide curable base resistant elastomer from DuPont Dow Elastomers. It is based on a copolymer of tetrafluoroethylene, ethylene, perfluoromethyl vinyl ether, and a cure site monomer.

Tecnoflon® P 757 is a peroxide curable fluorocarbon elastomer with cure site monomers, from Solvay. It is based on a terpolymer of tetrafluoroethylene, hexafluoropropylene, and vinylidene fluoride.

Hylar® MP 10 is a polyvinylidene fluoride thermoplastic polymer from Solvay.

Kynar Flex 2500-20 is a polyvinylidene fluoride based thermoplastic polymer from Atofina. It is based on a vinylidene fluoride copolymer.

Halar® 500LC is a thermoplastic copolymer of ethylene and chlorotrifluoroethylene.

Viton® TBR-605 is a phenol curable fluorocarbon elastomer with phenol curing agents incorporated.

Dyneon BRE 7231X is a cure incorporated phenol curable fluorocarbon elastomer.

Luperox® 101XIA5 is a peroxide initiator from Arkema.

Rhenofit CF is a specially treated, finely divided calcium hydroxide white powder from Rhein Chemie.

Elastomag® 170 is MgO from Rohm and Haas

Cheminox® AF50 is a fluorinated bisphenol crosslinking agent from Unimatec.

Cheminox LN35 is a phosphonium salt for use with phenol crosslinkers, from Unimatec.

Filler used in Examples 3-8 is a mix of graphite and calcium silicate material.

The comparative example is a molded base resistant fluorocarbon rubber prepared by blending the following according the manufacturer's instructions.

| | |
|---|---|
| Viton ETP 600S: | 100 pph |
| Luperox 101XL45: | 3 pph |

-continued

| | |
|---|---|
| TAIC: | 3 pph |
| ZnO: | 3 pph |
| Carbon black: | 30 pph |

The rubber is cured in a mold for 7 minutes at 177° C., and post-cured 16 hours at 232° C.

Examples 1, 3, and 5-8 are made by dynamic vulcanization of a fluorocarbon elastomer (ETP 600S or P 757) with a radical curing system (Luperox 101XIA5, triallylisocyanurate, and ZnO) in the presence of a thermoplastic (Hylar MP 10, Halar LC50, or Kynar Flex 2500-20), and further in the presence of polyol curing system, the latter added either as separate components (Examples 1 and 3) or as part of cure incorporated phenol curable fluorocarbon elastomer (Examples 5-8). Examples 2 and 4 are made by curing with a radical curing system only.

In a batch process, the peroxide curable elastomer (Tecnoflon P757 or Viton ETP 600S), the thermoplastic (Hylar MP-10, Halar 500LC, or Kynar Flex 2500-04), and if present the phenol curable elastomer (BRE 7231X or TBR-605) are mixed and melted in a Brabender or Banbury type batch mixer at 160° C. for 5 minutes. The zinc oxide, carbon black, and filler are then stirred in. A curative package consisting of Luperco 101 XL and TAIC is added to the mixer and stirred for an additional 3-5 minutes at 160° C. to form a fully cured thermoplastic vulcanizate. Then the temperature is increased to 260° C. and the mixture is stirred an additional 3-5 minutes to cure the elastomer or elastomers with a phenol crosslinking. Note that for Examples 1 and 3, the phenol curing system of Rhenofit CF, Elastomag 170, Cheminox AF50, and Cheminox LN35 is also added prior to or along with increasing the temperature. The composition is then discharged from the batch mixer and granulated to make small size pellets for use in subsequent shaped article fabrication processes, such as injection molding, compression molding, blow molding, single layer extrusion, multi-layer extrusion, insert molding, and the like.

A continuous process is carried out in a twin-screw extruder. Pellets of fluoroelastomer (peroxide curable and if present phenol curable) and thermoplastic are mixed and added to a hopper. The pellets are fed into the barrel, which is heated to 160° C. The screw speed is 100-200 rpm. A curative package consisting of Luperco 101 XL, TAIC, ZnO and carbon black is then fed into the barrel at a downstream port located about one third of the total barrel length from the extruder exit. The ingredients are melted and blended with the molten elastomer and fluoroplastic mixture for a time determined by the screw speed and the length of the barrel. For example, the residence time is about 4-5 minutes at 100 rpm and about 2-2.5 minutes at 200 rpm. Then the barrel temperature is raised to 260° C. and the mixture is continued to be mixed with shear for an additional time determined by the length of the barrel and the speed of the screw, for example about 5 minutes. If necessary (Examples 1 and 3), the phenol curative system is added with a second hopper at the point where the barrel temperature increases. The cured material is extruded through a 1-3 mm diameter strand die and is quenched by cooling in a water bath before passing through a strand pelletizer. The pellets are processed by a wide variety of thermoplastic techniques into molded articles. The material is also being formed into plaques for the measurement of physical properties.

Test pieces of the comparative Example and Examples 1-8 are tested for base resistance by submerging them in a test fluid for 168 hours at 150° C. The test fluid is a mixture of 94% Stuarco 7061 gear oil with 6% Stuarco 7098 modifier.

Changes in physical properties are measured after the test and expressed as a percentage change from the value measured before the exposure. Values are reported in the Table.

| | Comparative phr | 1 phr | 2 phr | 3 phr | 4 phr | 5 phr | 6 phr | 7 phr | 8 phr |
|---|---|---|---|---|---|---|---|---|---|
| Viton ETP 600S | 100 | | | 100 | 100 | 50 | 25 | 50 | 25 |
| Tecnoflon P757 | | 100 | 100 | | | | | | |
| ZnO | 3 | 5 | 5 | 3 | 5 | 1.5 | 0.8 | 1.5 | 0.8 |
| triallylisocyanurate | 3 | 3 | 3 | 3 | 3 | 1.5 | 0.8 | 1.5 | 0.8 |
| Luperox 101XL45 | 3 | 3 | 3 | 3 | 3 | 1.5 | 0.8 | 1.5 | 0.8 |
| Rhenofit Cf | | 6 | | 6 | | | | | |
| MgO (Elastomag 170) | | 3 | | 3 | | 4 | 6 | 4 | 6 |
| Cheminox AF50 | | 4 | | 4 | | | | | |
| Cheminox LN35 | | 1 | | 1 | | | | | |
| Viton TBR-605 | | | | | | 50 | 75 | 50 | 75 |
| Dyneon BRE 7231X | | | | | | 5 | 5 | 5 | 5 |
| Carbon black | 30 | 10 | 10 | 10 | 10 | 30 | 30 | 30 | 30 |
| Halar 500LC | | | | | | | | 26.3 | 26.3 |
| Hylar MP-10 | | | | 25 | 25 | 26.3 | 26.3 | | |
| Kynar Flex 2500-20 | | 25 | 50 | | | | | | |
| Filler | | | | 20 | 20 | 21 | 21 | 21 | 21 |
| | % | % | % | % | % | % | % | % | % |
| Change in tensile strength | −27 | −15 | −26 | −6 | −13 | −11 | −11 | −8 | −9 |
| Change in 50% modulus | −30 | −12 | 2 | −8 | −11 | — | −10 | −7 | −10 |
| Change in 100% modulus | −37 | — | 6 | — | 4 | — | — | — | −8 |
| Change in elongation | 19 | −11 | −32 | 8 | −12 | −9 | 3 | 22 | 18 |
| Change in hardness (Shore A) | −3 | −9 | −48 | 1 | −9 | −1 | 1 | −1 | 1 |
| Change in volume | 3 | 7 | 18 | 3 | 11 | 3 | 5 | 4 | 7 |

We claim:

1. A processable rubber composition comprising an amorphous phase dispersed in a thermoplastic phase,
    wherein the amorphous phase comprises a fluorocarbon elastomer composition crosslinked with both a radical curing system and a polyol curing system; and
    wherein the thermoplastic phase comprises a thermoplastic polymeric material.

2. A composition according to claim 1, wherein the amorphous phase is non-continuous and the thermoplastic phase is continuous.

3. A composition according to claim 1, comprising particles of cured fluorocarbon elastomer dispersed in a continuous thermoplastic phase.

4. A composition according to claim 1, wherein the fluorocarbon elastomer composition comprises a fluoropolymer with repeating units derived from at least one fluoroolefin and further comprising at least one peroxide cure site, wherein the cure site comprises at least one of a C—Cl bond, a C—Br bond, a C—I bond, and an olefin.

5. A composition according to claim 1, wherein the fluorocarbon elastomer composition comprises a copolymer of tetrafluoroethylene and a $C_{2-4}$ olefin.

6. A composition according to claim 1, wherein the fluorocarbon elastomer comprises a copolymer of tetrafluoroethylene, hexafluoropropylene, and vinylidene fluoride.

7. A composition according to claim 1, wherein the thermoplastic polymeric material comprises a fluoroplastic.

8. A composition according to claim 1, wherein the thermoplastic polymeric material comprises polyvinylidene fluoride.

9. A composition according to claim 1, wherein the thermoplastic polymeric material comprises a copolymer of ethylene and chlorotrifluoroethylene.

10. A shaped article prepared by thermoplastic processing of a composition according to claim 1.

11. A shaped article having elastomeric properties, the article comprising an amorphous composition dispersed in a thermoplastic composition,
    wherein the amorphous composition comprises a fluorocarbon elastomer composition crosslinked with both a radical curing system and a polyol curing system, and
    wherein the thermoplastic composition comprises a thermoplastic polymeric material.

12. A composition according to claim 11, wherein the thermoplastic polymeric material comprises an amorphous material with a glass transition temperature of 120° C. or higher or a semi-crystalline polymeric material with a crystalline melting point of 120° C. or higher.

13. A shaped article according to claim 11, wherein the thennoplastic polymeric material has a crystalline melting point 150° C. or higher.

14. A composition according to claim 13, wherein the thermoplastic polymeric material has a crystalline melting point of 200° C. or higher.

15. A shaped article according to claim 11, wherein the thermoplastic polymeric material comprises a fluoroplastic.

16. A shaped article according to claim 11, wherein the thermoplastic polymeric material comprises polyvinylidene fluoride.

17. A composition according to claim 11, wherein the thermoplastic polymeric material comprises a copolymer of ethylene and chlorotrifluoroethylene.

18. A shaped article according to claim 11, wherein the fluorocarbon elastomer comprises a copolymer of tetrafluoroethylene and a $C_{2-4}$ olefin.

19. A shaped article according to claim 11, wherein the fluorocarbon elastomer comprises a copolymer of tetrafluoroethylene, hexafluoropropylene, and vinylidene fluoride.

20. A rubber sealing member according to claim 11.

21. An o-ring according to claim 11.

22. A gasket according to claim 11.

23. A rubber sealing member according to claim 15.

24. An o-ring according to claim 15.

25. A gasket according to claim 15.

26. A shaped article according to claim 15, wherein the fluorocarbon elastomer comprises a copolymer of tetrafluoroethylene, hexafluoropropylene, and vinylidene fluoride.

* * * * *